March 16, 1965 H. R. MONROE 3,174,103
RADIO FREQUENCY BEACON TRANSMITTER SYSTEM
Filed Sept. 6, 1962
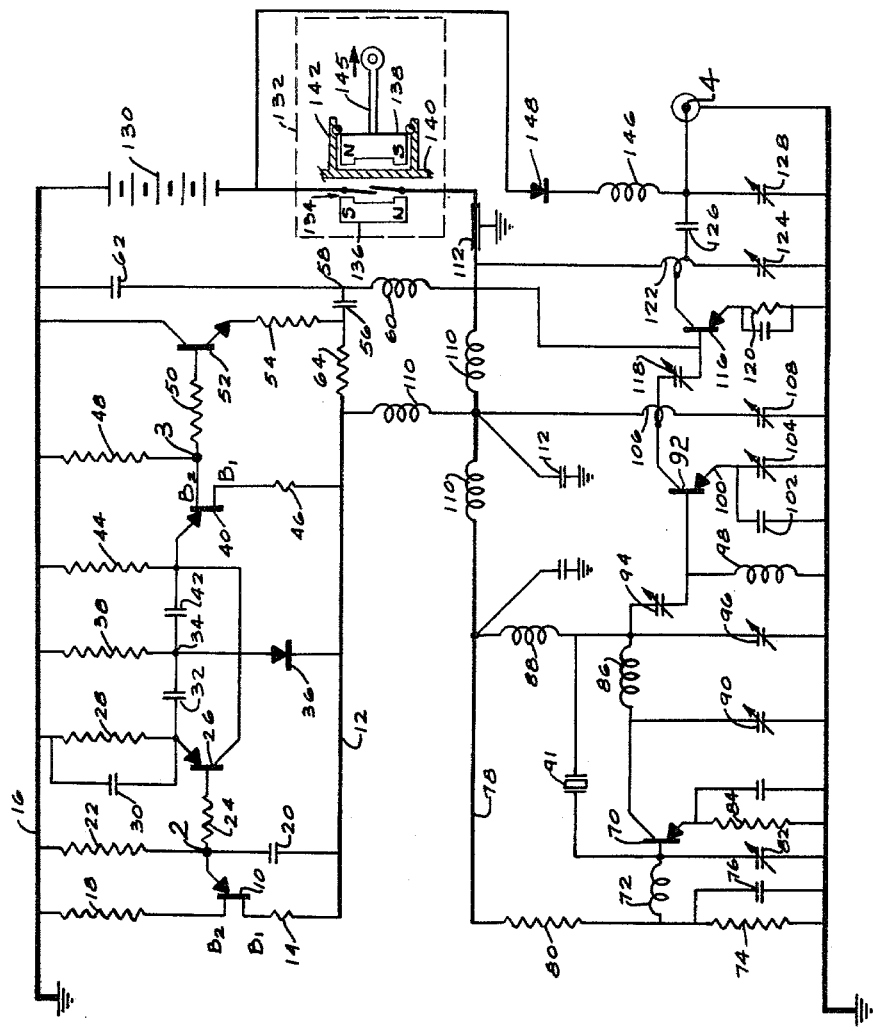
FIG. 1
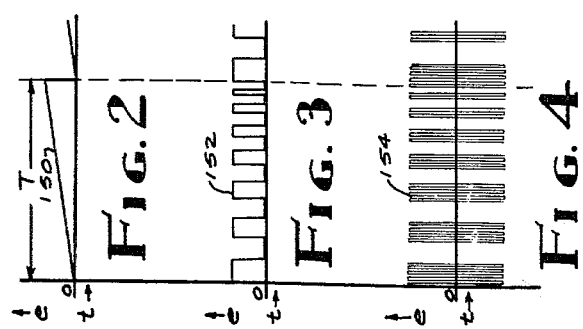
FIG. 2
FIG. 3
FIG. 4
HAROLD R. MONROE
INVENTOR.
BY Daniel T. Anderson
ATTORNEY

# United States Patent Office 3,174,103
Patented Mar. 16, 1965

3,174,103
RADIO FREQUENCY BEACON TRANSMITTER SYSTEM
Harold Richard Monroe, Santa Monica, Calif., assignor to Douglas Aircraft Company, Inc., Santa Monica, Calif.
Filed Sept. 6, 1962, Ser. No. 221,804
9 Claims. (Cl. 325—111)

This invention relates generally to radio frequency beacon transmitters and more particularly to highly efficient and compact battery energized networks for use therein.

The present invention finds particularly useful application in combination with systems, as for aiding in the rescue of a downed airman, in which a miniature transmitter carried on the person is automatically energized to produce and radiate a homing beacon signal as soon as the rip cord is actuated; and much of the discussion of examples herein relates thereto. However, it is emphasized that the scope of the invention is not limited to a specific such use. Other examples include police distress systems, mountain climbing equipment, or other systems to be carried by persons who can foresee the need of rescue in their activities. Still other examples include air drop of equipment and supplies and other such operations where a homing signal is desirable.

It is generally desirable that a battery operated beacon transmitter be as efficient as possible in order to radiate an omnidirectional homing signal to the greatest possible distance for the longest possible term for a given battery. When the transmitter is to be included in a survival kit of an airman, each additional ounce of weight and cubic centimeter of space required for the transmitter's battery power supply is a critical consideration in determining the feasibility of including the system. On the other hand, if sufficient battery energy is not supplied for a transmitter range of many miles for a period of many hours, the system may be deemed not worth the weight and expense on that score.

Prior art attempts to provide compact, long-life beacon transmitters have typically been directed toward the design of simplified circuits having a relatively small number of components and which can be packed into a small volume package. However, the simplified circuits generally are less efficient, less reliable, and less stable with regard either to modulation signal or carrier signal output frequency or to both. Typically the compact circuit which is evolved in such attempts suffers the disadvantage of wasting an appreciable portion of the battery energy in generating undesirable harmonics of the specified output frequency thusly reducing range or battery life. Other typical disadvantages include output frequency drift which causes a lower probability of detection by the rescue receiver. A further disadvantage of prior art compact beacons is that in simplifying and compromising the circuitry, the modulator does not have the capability of providing a truly distinctive distress signal.

Prior art beacon transmitters, which do not exhibit such disadvantages in circuit performance, have been severely expensive in space or weight or cost requirements such as to preclude their utilization in applications where the desirability of their function would otherwise dictate their inclusion.

It is therefore an object of the present invention to provide a beacon network system which is not subject to these and other disadvantages of the prior art.

It is another object to provide such a network which permits automatic and continuous beacon transmission for hundreds of miles for a period of more than thirty hours.

It is another object to provide such a network which is exceedingly stable with regard to output signal frequency and which transmits a truly distinctive distress signal.

It is another object to provide such a system which, although completely sealed within a rigid-walled package, is automatically energized in response to an external action.

It is another object to provide such a sealed system which has a single electrical terminal for connection either to a battery charger or to the antenna.

It is another object to provide such a beacon network which weighs only a few ounces and which has overall package volume of the order of fifteen cubic inches.

Briefly these and other objects are achieved in one example of the present invention which includes a crystal controlled transistor oscillator and frequency doubler circuit. The oscillator stage includes strong feedback through the crystal which assures a stable fundamental frequency. The doubler stage includes a "floating-emitter" transistor which is coupled to a return only by high resistance capacitors.

The absence of the conventional resistive path from the doubler emitter reduces battery current through that stage to one fourth of its usual magnitude and reduces battery drain by approximately one third. This feature alone has been found to provide approximately ten additional hours of beacon operation from a 3400 milliampere hour mercury cell battery. With a conventional resistive emitter return, approximately twenty-five percent of the radio frequency energy in the output of that stage is at the fundamental frequency. However, the floating emitter causes substantially the complete removal, from the output of that stage, of any radio frequency energy at the fundamental frequency. This further reduces battery drain by not requiring any collector current in that stage for amplification of the undesired and useless frequency.

A modulator circuit is provided, in this example, which includes a unijunction transistor oscillator that generates an audio frequency distress signal. The modulator output is a signal which varies substantially linearly in tone from 300 cycles per second to 1000 cycles per second, then "snaps" back to 300 cycles and repeats the sawtooth type of gradual tone increase to 1000 cycles at a repetition rate of approximately 2½ times per second.

A rigid-walled package for the circuitry is provided which is continuous in all respects except for an antenna output terminal. When the enclosed battery is a rechargable type, internal circuit means is provided so that the antenna terminal may also serve as an input jack for a battery charger without requiring the actuation of any switch on or within the package.

The network is energized by the removal as by a rip cord of a small permanent magnet from its seat affixed to the outside of the package. The package wall in at least that region is non-magnetic and permits the magnetic coupling of the external magnet to an internal magnetic relay. If desired, the magnet may be replaced and the circuit de-energized to permit shelf testing or to permit the user in a distress situation to conserve the battery for the most beneficial periods of use.

Further details of these and other novel features and their operation as well as additional objects and advantages will become apparent and be best understood from a consideration of the following description taken in connection with the accompanying drawing which is presented by way of example only and in which:

FIG. 1 is an overall schematic diagram of one example of a beacon network constructed in accordance with the principles of the present invention;

FIG. 2, FIG. 3, and FIG. 4 are wave form diagrams showing typical graphs of voltage versus time at circuit points "2," "3," and "4," respectively, of FIG. 1. The three graphs have a common time axis.

Referring to the particular figures in more detail, it is stressed that the details shown are by way of example only and are presented in the cause of providing what is believed to be the most useful and readily understood description of the principles of the invention. The detailed showing is not to be taken as a limitation on the scope of the invention which is defined by the appended claims forming a part of this specification.

In FIG. 1 a modulator control saw-tooth oscillator stage is illustrated including a double base diode or unijunction transistor 10 which may be a type 2N491. The base one of this control transistor 10 is connected by the B⁻ bus 12 through a resistor 14 which may have a value of zero to a few ohms; and the base two is returned to a ground bus 16 through a control resistor 18 which may be of the order of one kilohm. The emitter electrode of the transistor 10 is connected to a relaxation oscillator capacitor 20 the other terminal of which is connected to the B⁻ bus and which may have a value of 15 microfarads. The charge control path for the capacitor 20 is a resistor 22 which is connected between the emitter electrode (circuit point "2") and ground and which has a value, in this example, of 47 kilohms.

The saw-tooth output signal on the oscillator capacitor 20 is coupled through a resistor 24 to the control electrode of a "variable resistance" transistor 26 which may be a type 2N1193. The emitter electrode of the transistor 26 is returned to ground through a resistor 28 which may have a value of 100 kilohms and be bypassed by a capacitor 30. The emitter is also coupled through a capacitor 32 to a circuit node 34 which is clamped to the B⁻ bus 12 through a voltage regulator diode 36 which may be a silicon type 1N2071. The anode, circuit node 34, of the diode 36 is connected to ground through a resistor 38 and the cathode is connected to B⁻; thus the circuit node 34 is maintained at a potential approximately .7 volt positive with respect to B⁻ when the latter is maintained at approximately 13 volts negative with respect to ground. The capacitor 32 may have a value of .22 microfarad.

A modulator oscillator unijunction transistor 40 is provided, as shown, having its emitter electrode coupled to the collector electrode of the "variable resistance" transistor 26 and to the circuit node 34 through a capacitor 42 which may have a value of .15 microfarad. The emitter of the transistor 40 is also connected to the ground bus 16 through a charging resistor 44 which in this example may have a value of 10 kilohms. The transistor 40 may again be a type 2N491.

The base one of the transistor 40 is connected to B⁻ through a small resistor 46 which, as with the stabilizing resistor 14, may have a value of from zero to a few ohms as desired. The base two of the double base diode is returned to ground through a resistor 48 which may have a value of 1.8 kilohms.

The modulator oscillator output signal from its base two is coupled through a resistor 50 to the control electrode of an emitter follower transistor 52 which may be a type 2N1306. The emitter of the transistor 52 is connected through a resistor 54 and a coupling capacitor 56 to the modulator output terminal 58 which is isolated from radio frequency signals by a choke coil 60 and a capacitor 62. The emitter of the transistor 52 is returned to B⁻ through a load resistor 64 which may have a value of 900 ohms.

A UHF radio frequency oscillator is shown which includes an oscillator transistor 70 having its control electrode connected to a circuit tuned, in this example, to a resonant frequency of 121.5 megacycles per second. The tuned circuit includes a coil 72, which may have a value of .15 microhenry, connected between the base electrode and a biasing resistor 74 the other terminal of which is returned to ground. The junction of the resistor 74 and the coil 72 is bypassed to ground by a capacitor 76. The bypassed terminal of the resistor 74 is connected to a B⁻ bus 78 by a resistor 80 which, in this example, has a value of 15 kilohms. A tuning capacitor 82, which may have a value of 2.5 to 11 picofarads, is coupled between the base of the transistor 70 and ground.

The emitter of the transistor 70 is returned to ground through a bypassed resistor 84 which may have a value of 120 ohms. The collector circuit is also tuned to 121.5 megacycles and includes a coil 86 connected to B⁻ through a bypassed choke coil 88 and a tuning capacitor 90 connected between the collector and ground. The coil 86 and the capacitor 90 may have values approximately equal to those of the coil 72 and the capacitor 82 respectively.

A strong, frequency stabilizing feedback path is provided between the output terminal of the coil 86 and the control electrode of the oscillator transistor 70 by virtue of a 121.5 megacycle crystal 91 connected therebetween.

The output terminal of the coil 86 is also coupled to the input or control electrode circuit of a frequency doubler and amplifier transistor 92, which may be a type 2N1692, through a variable capacitor 94 which, in this example, has a range of 9 to 35 picofarads. A similar capacitor 96 is connected between the output terminal of the coil 86 and ground.

The base electrode of the transistor 92 is connected to ground through a radio frequency choke coil 98. The output circuit of this double stage is tuned to 243 megacycles and includes the "floating" emitter 100 which is coupled to ground only through a capacitor 102 which may have a value of 250 picofarads and a trimmer capacitor 104 which may have a value of 9 to 35 picofarads. The collector electrode is connected to a tap on a coil 106 which may have a total inductance of approximately .02 microhenry.

This tapped coil, which may be a few turns of goldplated wire provides impedance matching between stages and affords a means of balancing out the emitter-collector capacitance of the transistor 92. This increases the Q of the stage and permits an adequate tuning capability with the small capacitor 108.

The outer terminals of the coil 106 are connected respectively to ground through a tuning capacitor 108, which may have a value of 2.5 to 11 picofarads and to B⁻ at a point thereon radio frequency isolated from the supply and from buses 12 and 78 by choke coils 110 and associated capacitors 112.

The collector electrode of the doubler transistor 92 is coupled to the control electrode 114 of a mixture and amplifier transistor 116, which may also be a type 2N1692, through a variable capacitor 118 which in this example has a range of 9 to 35 picofarads. The input and output circuits of the mixer are both tuned to 243 megacycles with the emitter electrode returned to ground through a bypassed bias resistor 120 which may have a value of approximately 20 ohms.

A double tapped coil 122 is shown connected between the B⁻ bus and a trimmer capacitor 124 which may have a range of 1 to 8 picofarads. The tap of the coil 122 which is nearest to the B⁻ terminal is connected to the collector of the mixer transistor 116 and provides an impedance between collector and B⁻ (RF ground) of approximately 30 ohms to match that of the collector impedance. The other tap of the coil 122 is coupled through a capacitor 126 to an antenna jack "4" and provides an antenna matching impedance to B⁻ of approximately 60 ohms. The antenna circuit is tuned by a trimmer capacitor 128.

A source 130 of direct current potential is connected between ground and the B⁻ bus system. The source may be a 13.5 volt mercury cell or may be a rechargeable silver cadmium battery. In either event, the shelf life of the source reliably exceeds three years. In the case of the silver cadmium example, it may be continuously trickle-charged, or may be lightly recharged up to one thousand times without actuating any switch or other mechanism within the network package. This recharging ability is achieved by virtue of a magnetic relay switch 132 which is interconnected in series between the source 130 and the B− bus. The switch 132 includes a pair of reeds 134 of paramagnetic material which attract and connect to each other when their environment includes a magnetizing field. Such a magnetic field is "normally" provided by an internal holding permanent magnet 136. However, a field cancelling permanent magnet 138 is disposed just outside of the non-magnetic package wall 140 in a position and orientation such as to cause its field to be superimposed, in the environment of the reeds, 134, and to buck or cancel out the field due to the magnet 136. Thus, when both magnets are in place, the reeds 134 are not attracted to each other, and the circuit is not energized.

The external magnet 138 is removably held against the outer surface of the package wall 140 by a fastener 142 which may include clips, ball and detent means as shown, or merely glue or adhesive tape. When the magnet 138 is removed from the fastener 142, as by pulling on its extension 145, the field of the holding magnet 136 prevails and the reeds 134 make contact to energize the circuit.

Recharging of the battery source 130 may be achieved as desired by connecting the antenna jack "4" to an external battery charger. A series choke coil 146 and isolating diode 148 are shown connected between the jack and the negative terminal of the battery source 130. By the illustrated means, charging current can flow into the jack, through the coil and diode, and into the battery. The charging circuit is isolated from the radio frequency by the capacitor 126. Similarly, the radio frequency energy is isolated from the battery circuit during transmitting operation by the choke coil 146.

In operation, and with reference to the graphs of FIG. 2, FIG. 3 and FIG. 4, the first unijunction transistor 10 generates a control signal represented by the sawtooth, graph 150 of FIG. 2. The sawtooth signal is repetitive and has a frequency of approximately 2½ cycles per second, a typical period of which is designated "T" in the figures. The output of the transistor 10 is coupled to the "variable resistance" transistor 26 in the control, emitter, circuit of the second oscillator transistor 40. The magnitude of total resistance in this RC control circuit determines the instantaneous frequency of oscillation of the circuit associated with the transistor 40; and the amount of resistance contributed by the "variable resistance" transistor 26 causes the frequency of oscillation to vary from 300 to 1000 cycles per second in a sawtooth rate of frequency change.

The oscillator output is taken from the base two of the transistor 40 and is therefore in the form of a square wave signal as illustrated, not to scale, by the graph 152 of FIG. 3. This signal as a modulator output is coupled to the control electrode 114 of the mixer and amplifier transistor 116 in the radio frequency circuit to turn the transmitter effectively on and off at the square wave rate of the graph 152. The resultant beacon output signal is therefore a carrier wave signal of substantially constant radio frequency, 243 megacycles in this example, which is turned on and off at a varying rate as illustrated by the graph 154 of FIG. 4. The result is a clearly distinctive distress signal, which because of the crystal control in the oscillator and the "clean" output signal of the doubler stage has a relatively high probability of detection.

There has thus been described an example of a beacon network system which exhibits all the advantages and achieves all the objects set forth above.

What is claimed is:

1. A radio beacon network comprising:
   a fundamental radio frequency oscillator transistor circuit including
   an oscillator control electrode resonant circuit tuned to said fundamental frequency
   an oscillator output electrode resonant circuit tuned to said fundamental frequency and
   a frequency stabilizing feedback path intercoupled between said output electrode circuit and said control electrode circuit including a radio frequency crystal resonant at said fundamental frequency;
   a frequency doubler transistor circuit including a control electrode resonant circuit
   tuned to said fundamental frequency and coupled to said oscillator output circuit,
   a doubler output circuit tuned to twice said fundamental frequency
   a floating emitter circuit isolated in a direct current sense from the remainder of said network and
   capacitor means coupled between said floating emitter and a return bus;
   an antenna terminal;
   a mixer transistor circuit intercoupled between said antenna terminal and said doubler output circuit and including
   a control electrode circuit tuned to the doubled frequency and coupled to said doubler output circuit; and
   a transistor modulator circuit for automatically generating a modulating signal and having an output terminal coupled to said mixer control electrode circuit for modulating said doubler frequency signal with said signal.

2. The invention according to claim 1 in which said transistor modulator circuit comprises:
   a modulator oscillator transistor circuit;
   an input control circuit coupled thereto and having an effective magnitude of resistance for determining the instantaneous frequency of oscillation of said modulator transistor;
   a variable resistance transistor coupled to said input control circuit of said modulator oscillator transistor for determining said effective magnitude of resistance of said input control circuit; and
   a control oscillator coupled to the control electrode of said variable resistance transistor for periodically varying its magnitude of resistance thereby to vary periodically the frequency of oscillation of said modulator transistor.

3. The invention according to claim 2 which further includes:
   a source of direct current potential for energizing said network;
   a magnetic holding relay interconnecting said source and said network and being of the character to disconnect when its magnetic holding field is cancelled; and
   removable holding field cancelling magnetic means disposed contiguously to said network in magnetic interaction relationship with said holding relay.

4. The invention according to claim 3 in which said source is a rechargable battery and which further includes a battery charging circuit coupled between said source and said antenna jack and comprising:
   radio frequency isolating choke means coupled to said jack; and
   unidirectional direct current flow means coupled between said choke means and said source for permitting battery charging current to flow from said antenna jack to said source while isolating said source from radio frequency signals on said antenna jack.

5. A beacon network system comprising:
   a modulator oscillator circuit including
   a transistor oscillator having an effective RC combination coupled to its control electrode, said RC combination including a variable resistance circuit for repetitively varying the frequency of said oscillator and comprising
　　a control oscillator for generating and providing at its output terminal a repetitive control signal, and
　　a variable resistance transistor having its control electrode coupled to said control oscillator output terminal and its emitter and collector connected in said RC combination for varying the effective magnitude of the resistance therein responsive to said repetitive control signal;
a crystal controlled oscillator for generating a fundamental radio frequency signal;
a frequency doubler circuit comprising a transistor amplifier having means for tuning its control electrode circuit to said fundamental frequency and having
　　means for tuning its output electrode circuit to twice said fundamental frequency and having its emitter electrode returned to said doubler circuit only through capacitor coupling;
a mixer circuit including a transistor having a control electrode coupled to said doubler circuit and to said modulator oscillator circuit for modulating the radio frequency output signal of said doubler circuit;
an antenna jack; and
impedance matching means intercoupled between said antenna jack and the output electrode of said mixer circuit transistor.

6. A beacon network system comprising:
a crystal controlled UHF oscillator for generating a fundamental radio frequency;
a frequency doubler amplifier stage coupled to said oscillator and including
　　a transistor having its emitter electrode returned to the network only through capacitor coupling and having its output circuit tuned to a predetermined harmonic of said fundamental frequency;
a mixer stage coupled to said doubler stage and including
　　an output circuit tuned to said harmonics;
an antenna terminal coupled to said mixer output circuit;
a modulator oscillator network including:
　　a first unijunction transistor sawtooth oscillator for generating control signals at a rate of the order of a few cycles per second;
a second unijunction transistor oscillator for generating modulating signals in a frequency range of the order of a few hundred cycles per second to the order of a thousand cycles per second and having its control electrode coupled to said first unijunction transistor whereby the instantaneous frequency of the second unijunction oscillator is determined by the output signal of the first unijunction oscillator,
　　said second unijunction oscillator being coupled to the control electrode of said mixer stage;
a supply battery;
magnetic relay means for electrically energizingly connecting said battery to said network system; and
magnetic actuator means in removable magnetic coupling relationship with said magnetic relay means.

7. A beacon network for radiating radio frequency signals comprising:
a fundamental radio frequency oscillator transistor circuit including
　　an oscillator control electrode resonant circuit tuned to said fundamental frequency,
　　an oscillator output electrode resonant circuit tuned to said fundamental frequency, and
　　a frequency stabilizing network intercoupled between said output electrode circuit and said control electrode circuit including a radio frequency crystal resonant at said fundamental frequency;
a frequency doubler transistor circuit including
　　a control electrode resonant circuit tuned to said fundamental frequency and coupled to said oscillator output circuit,
　　a doubler output circuit tuned to twice said fundamental frequency,
　　a floating emitter circuit isolated, in a direct current sense, from the remainder of said network, and
　　capacitor means coupled between said floating emitter and a return bus;
an antenna terminal;
a mixer transistor circuit intercoupled between said antenna terminal and said doubler output circuit and including
　　a control electrode circuit tuned to the doubled frequency and coupled to said doubler output circuit; and
a transistor modulator circuit for automatically generating a modulating signal and having an output terminal coupled to at least one of said doubler and mixer circuits for modulating the output signals of said doubler circuit with said modulating signal.

8. A beacon network system comprising:
a modulator oscillator circuit including
　　a transistor oscillator having an effective RC combination coupled to its control electrode, said RC combination including a variable resistance circuit for repetitively varying the frequency of said oscillator and comprising
　　a control oscillator for generating and providing at its output terminal a sawtooth control signal, and
　　a variable resistance transistor having its control electrode coupled to said control oscillator output terminal and its emitter and collector connected in said RC combination for varying the effective magnitude of the resistance therein responsive to said sawtooth control signal;
a crystal controlled oscillator for generating a fundamental radio frequency signal;
a frequency doubler circuit comprising a transistor amplifier having means for tuning its control electrode circuit to said fundamental frequency and having
　　means for tuning its output electrode circuit to twice said fundamental frequency and having its emitter electrode returned to the circuit only through capacitor coupling; and
a mixer circuit including a transistor having a control electrode coupled to said doubler circuit, said modulator oscillator circuit being coupled to one of said doubler and mixer circuits for modulating the radio frequency output signal of said doubler circuit.

9. A beacon network system comprising:
a crystal controlled UHF oscillator for generating a fundamental radio frequency;
a frequency doubler amplifier stage coupled to said oscillator and including
　　a transistor having its emitter electrode returned to the network only through capacitor coupling and having its output circuit tuned to a predetermined harmonic of said fundamental frequency;
a mixer stage coupled to said doubler stage and including an output circuit tuned to said harmonics;
a modulator oscillator network including:
　　a first unijunction transistor sawtooth oscillator for generating control signals at a rate of the order of a few cycles per second;
a second unijunction transistor oscillator for generating modulating signals in a frequency range of the order of a few hundred cycles per second to the order of a thousand cycles per second and having its control electrode coupled to said first unijunction transistor whereby the instantaneous frequency of the second unijunction oscillator is determined by the output signal of the first unijunction oscillator, said second unijunction oscillator being coupled to the control electrode of said mixer stage;
a supply battery;
magnetic relay means for coupling said battery to said network system in a manner to electrically energize said network system; and
a magnetic actuator means in removable magnetic coupling relationship with said magnetic relay means.

References Cited in the file of this patent
UNITED STATES PATENTS 3,068,415     Johnson _____ Dec. 11, 1962
3,108,223     Hunter _____ Oct. 22, 1963